United States Patent

[11] 3,630,544

[72] Inventors James L. Grisham
West Burlington;
Rudolf Horsch, Burlington, both of Iowa
[21] Appl. No. 44,915
[22] Filed June 10, 1970
[45] Patented Dec. 28, 1971
[73] Assignee J. I. Case Company
Racine, Wis.

[54] STABILIZER FOR EARTHMOVING MACHINERY
2 Claims, 5 Drawing Figs.
[52] U.S. Cl..................................................... 280/150.5,
212/145
[51] Int. Cl..................................................... B60s 9/02
[50] Field of Search........................................... 280/150.5,
150 C, 43.23; 212/145

[56] References Cited
UNITED STATES PATENTS
2,750,204  6/1956  Ohrmann ..................... 280/43.23
2,375,264  5/1945  Wagner ......................... 212/145
3,310,181  3/1967  Symmank..................... 212/145

Primary Examiner—Benjamin Hersh
Assistant Examiner—Robert R. Song
Attorney—Cullen, Settle, Sloman & Cantor ABSTRACT: An earthmoving machine, such as a backhoe or the like, carried on a vehicle which is provided with opposite, outwardly extending stabilizer arms which are pivotally mounted on the machine by universal pivot arrangement to permit swinging movement of the stabilizer arms in a vertical plane as well as adjustable angular movement of the stabilizer arms in a horizontal plane.

INVENTORS
JAMES LEE GRISHAM.
RUDOLF HORSCH.

BY:
CULLEN, SETTLE, SLOMAN & CANTOR.
ATT'YS.

INVENTORS
JAMES LEE GRISHAM.
RUDOLF HORSCH.
BY:
CULLEN, SETTLE, SLOMAN & CANTOR.
ATT'YS.

INVENTORS
JAMES LEE GRISHAM.
RUDOLF HORSCH.
BY:
CULLEN, SETTLE, SLOMAN & CANTOR.
ATT'YS.

3,630,544

STABILIZER FOR EARTHMOVING MACHINERY

BACKGROUND OF THE INVENTION

The present invention relates to stabilizing arrangements for vehicles and, more particularly, to stabilizing arrangements for mobile machinery such as vehicle-mounted backhoes, cranes, shovels, or the like.

Conventionally, some types of mobile machinery are mounted on vehicle chassis to facilitate movement of the machinery from one site of work operation to the next. The vehicle on which the machine is mounted is usually in the form of a tractor and the machine includes a mounting frame to which is pivoted a swing frame or boom pivoted on a vertical axis for lateral swinging movement relative to the mounting frame of the vehicle. Material handling or holding means, such as buckets or other implements, are usually carried by the swing frame, or boom, for movement therewith.

Generally, the wheelbase of the ground-engaging wheels of the tractor does not provide sufficient stability for the machine, when the machine is in a working position. This is particularly true in earth-moving machinery, such as shovels or backhoes, which are adapted to pick up a load in an extended position of the boom relative to the frame of the machinery and the vehicle, and to raise the load and carry the load to a place of disposal, likewise remote from the vehicle. This is accomplished by swinging movement of the swing fame, or boom, of the machine. The swinging frame, or boom, of the machinery is usually swingable along an arc within a range extending from one side of the vehicle or machine frame to the other and which, when loaded, tends to unbalance the vehicle, causing the vehicle and machine to be tripped over if no further stabilizing means are provided.

Conventional stabilizing means heretofore used have been relatively cumbersome in operation and are only satisfactory under limited working conditions. Particularly in backhoes or other earthmoving machinery working on a construction site, the machine must usually be set up on a rough terrain which frequently includes a sloping ground. The conventional types of stabilizing means are not sufficiently flexible to permit their adjustment relative to the vehicle and to the frame of the machine in order to provide a reasonable degree of stability in accordance with the ground surface, except where the machinery is supported on level ground, which puts a severe limitation on the usage of the machine.

Stabilizing means for such machinery are known in the form of outriggers or stabilizing arms adapted to be extended from the vehicle or from the frame of the machine from both sides thereof, and generally extending in a direction normal to the longitudinal centerline of the vehicle or of the machine. The stabilizing means are pivoted for swinging movement in a vertical plane into and out of ground-engaging contact. However, for the above-mentioned reasons, it is also desirable to adjust the horizontal angular position of the stabilizing means relative to the longitudinal centerline of the vehicle and the frame along an arc located in a horizontal plane.

In known construction of stabilizing means adapted to be adjustable angularly in a horizontal plane, the stabilizer arms, together with the working cylinders of the stabilizer arms, are mounted on a common bracket for pivoting movement in a vertical plane about a horizontal axis. The mounting bracket, in turn, is pivoted on the frame of the machinery for pivoting movement about a vertical axis and separate position-locking means are provided in the known structure to lock the stabilizing means means in the angularly adjusted position. This arrangement is unsatisfactory because of the cost of material and work involved in the provision of the multiple pivoting arrangement for the stabilizing means. In addition, this known arrangement adds considerable deadweight to the machinery which is highly undesirable.

SUMMARY OF THE INVENTION

The present invention provides an improved adjustable mounting arrangement for the stabilizing means of an earthmoving or other construction machinery to rigidly support the machine under any working conditions and on any ground surface.

The improved stabilizing means of the present invention comprises a rigid stabilizer arm having one end pivoted to the frame of the vehicle about a horizontal axis for swinging movement in a vertical plane and its other end pivotally connected to a ground-engaging pad. The extendable link or linear actuator for the stabilizing arm has one end pivotally connected to the outer end of the stabilizing arm, and its other end is pivoted to the frame of the machinery for movement about a horizontal axis in a vertical plane together with the stabilizer arm upon operation or activation of the extendable link. The stabilizer arm is attached between two brackets mounted on the frame of the machine, one of which is provided with a spherical bearing and the other bracket with at least two spaced apertures for the reception of a pivot pin. The pivot pin is removably inserted through the spherical bearing in the one bracket and through an aligned aperture at the end of the stabilizer arm and a selected, aligned aperture in the other bracket. The end of the extendable link pivoted to the frame of the machine is provided with an eye connector which receives a spherical bearing supported on the horizontal pivot pin of the extendable link.

Thus, if it is desired to adjust the horizontal position of the stabilizer arm relative to the longitudinal centerline of the vehicle and of the frame of the machine, the removable pin of the stabilizer arm is taken out of the aperture in that bracket which is provided with at least two apertures, whereafter the stabilizer arm is able to be swung around in a horizontal arc, and the pivot pin can be reinserted in another aperture of that bracket having at least tow apertures, to thereby vary the horizontal angular position of the stabilizer arm. This is made possible by the provision of spherical bearings at both the stabilizer arm connection and the extendable link connection to the frame of the machine.

With the present improvement of pivotally mounting a stabilizer arm assembly for both vertical and horizontal swinging movement, no separate brackets or vertical pivot means are necessary. Horizontal angular adjustment of the stabilizer arm assembly, in the present invention, is accomplished by the provision of (1) spherical bearings at the pivot connections of the stabilizer arm assembly to the frame of the vehicle or machine and (2) a removable pivot pin in conjunction with a fixed bracket having multiple spaced apertures. The pin is insertable into one or another of the apertures to support the assembly at various angularly adjusted positions relative to the centerline of the vehicle or frame of the machinery, the angular adjustment being accommodated by the spherical bearings.

The advantages and novel features of the present invention will become more apparent by reference to the following detailed description in connection with the appended drawings illustrating a preferred embodiment thereof.

BRIEF DESCRIPTION OF THE DRAWINGS

The preferred embodiment of the invention is illustrated in the accompanying drawings forming part of the detained description, and in which.

DESCRIPTION OF THE PREFERRED EMBODIMENT

Figure 1:
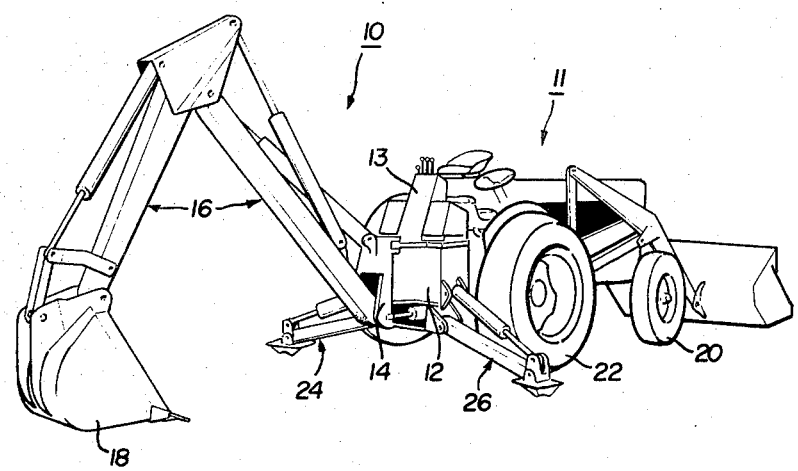
FIG. 1 is a perspective illustration of an earthmoving equipment, including a tractor vehicle and a backhoe attached thereto, provided with stabilizer means incorporating the present invention.

With reference now to FIG. 1 of the drawings, an earthmoving machine, such as a backhoe, indicated generally at 10, is shown attached to a vehicle, such as a tractor 11. The earthmoving machine, generally, consists of a housing or frame 12 rigidly connected to the tractor 11, a control panel 13 for operation of the earthmoving machine, a bracket 14 pivotally attached to the front end of the frame 12 for swinging movement about a vertical axis and which pivotally supports a boom or swinging frame assembly 16 having a load-handling device, such as a bucket 18, attached at its end. The construction of the boom or swinging frame assembly 16 is conventional and forms no part of the present invention which can be used with other load-handling and earthmoving machinery.

The vehicle or tractor 11 is provided with a pair of front and rear ground-engaging wheels 20 and 22, respectively, which normally support the tractor 11 and the machine 10 for movement of the tractor from one location to another.

A pair of stabilizing arm assemblies 24 and 26, respectively, are pivotally attached to the sides of the machine frame 12 for stabilizing the machine on the ground when the machine is in a working position. Normally, the stabilizer arm assemblies 24 and 26 extend from the lateral sides of the frame 12 adjacent the pair of wheels 20 of the tractor vehicle 11 in a direction substantially normal to the longitudinal centerline of vehicle 11, and protrude outwardly to a point beyond the dimension of the wheelbase of the tractor vehicle 11. Each of the stabilizer arm assemblies 24 and 26 is identical in construction and, therefore, the features of the present invention will be described in connection with only one stabilizer arm assembly 24, it being understood that the same novel features and construction arrangement apply likewise to the other stabilizer arm assembly 26 at the other side of the vehicle or machine.

With reference to the remaining figures, the stabilizer arm assembly 24 comprises a lower rigid strut member 28, one end of which is provided with a pivotal ground-engaging pad member 30 for support of the stabilizer assembly upon a ground surface when the earthmoving machinery is in an operating position.

Figure 4:
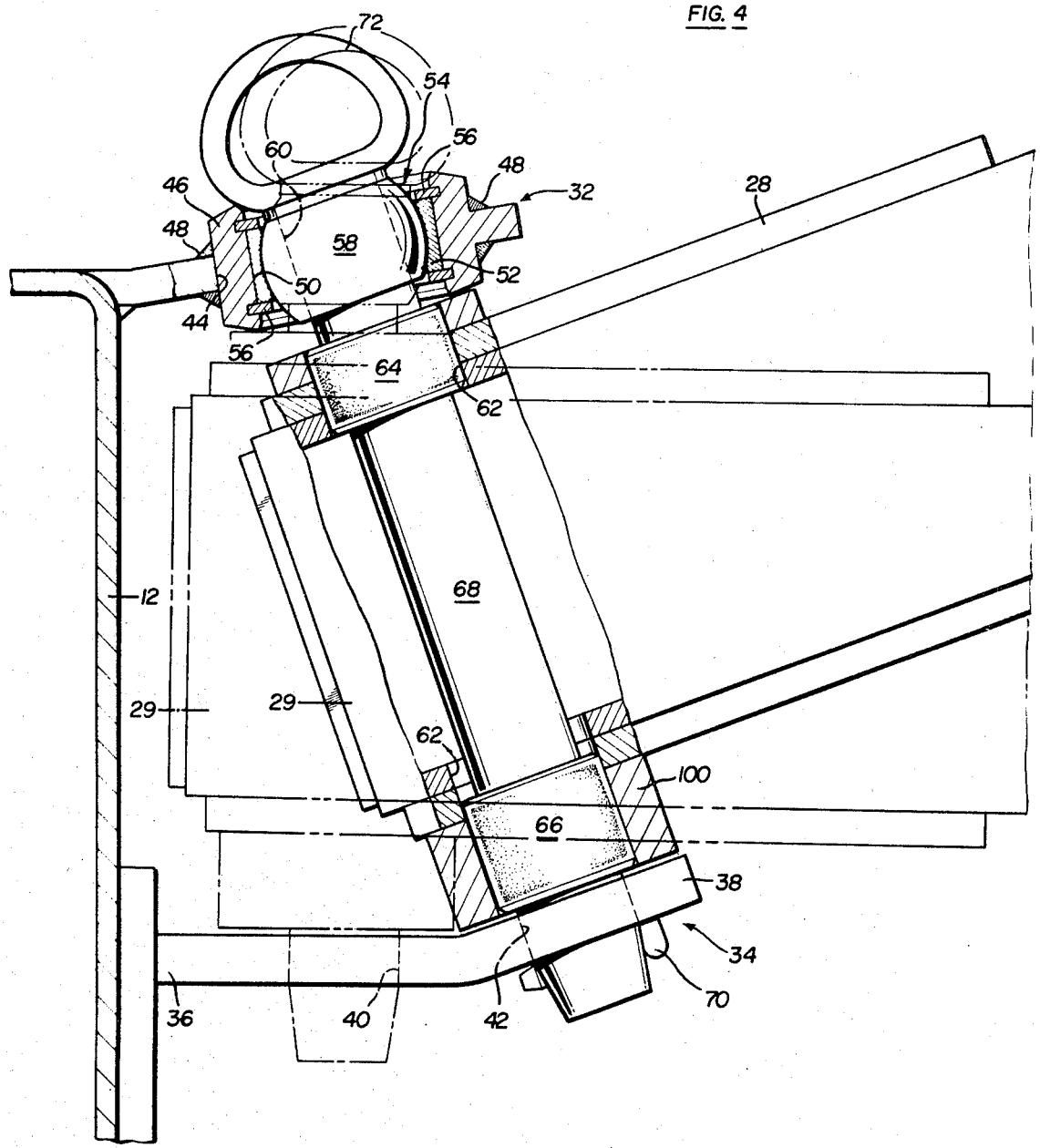
FIG. 4 is an enlarged section through the frame of the machinery just above the pivot connection of the stabilizer arm assembly, showing the pivot construction in more detail.

With particular reference to FIG. 4, the opposite end of the lower, ridge strut member 28 is disposed between a pair of bracket members 32 and 34 respectively, which are welded or otherwise secured to the side of the machinery frame 12. One of the bracket members, in this instance bracket member 34, is provided with an inner portion 36 extending substantially in a perpendicular direction from the lateral side of the frame 12 and an outer portion 38, disposed at an angle relative to the portion 36 in a direction toward the other bracket 32. The bracket portion 36 is provided with an aperture 40, and the bracket portion 38 is likewise provided with another aperture 42 of the same diameter as aperture 40.

The opposite bracket 32 is slightly angled relative to the lateral surface of the frame 12, and is provided with an aperture 44 of relatively large diameter, receiving a sleeve 46 which is externally ring-welded to the bracket 32 at both sides thereof, as at 48. The sleeve 46 is apertured, as at 50, to receive the outer member 52 of a spherical bearing assembly 54. The outer spherical bearing 52 is retained within the aperture 50 of the sleeve 46 by means of opposite retaining rings 56 to prevent axial displacement of the outer spherical bearing member 52, within the aperture 50.

The outer spherical bearing member 52 is adapted to receive an inner spherical bearing 58, which is provided with a central aperture 60 of identical diameter as the apertures 40 and 42 in the opposite bracket member 34, and which is adapted, in assembly, to be aligned with either of the apertures 40 or 42.

The inner end 29 of the rigid strut member 28 is provided with a transverse bore 62 adapted to receive a pair of axially, oppositely disposed bushings 64 and 68, respectively, which each have an internal axially aligned bore, having a diameter substantially corresponding to the diameter of the bores or apertures 40, 42 and 60 in the brackets 32 and 34 respectively.

The rigid strut member 28 is connected to the brackets 32 and 34 by means of a removable pivot pin 68 extending through the aperture 60 in the spherical bearing assembly 54, through the apertures in the bushings 64 and 66 of the strut member 28, and through either aperture 40 or 42 in the bracket member 34, and is secured in position by means of a lockpin 70 adjacent the outside of the bracket 34. The other end of the pivot pin 68 adjacent the outside of the spherical bearing assembly 54 is provided with a handle or grip portion in the form of an eye 72 to facilitate the removal and insertion of the pivot pin 68.

In the illustration in FIG. 4, the dot-and-dash lines indicate the extended position of the rigid strut member 28 of the stabilizer arm assembly extending in a direction substantially perpendicular to the lateral surface of the outside of the frame 12. In order to relocate the position of the rigid strut member 28 to the angular position shown by solid lines in FIG. 4, the lockpin 70 is removed from the end of the pivot pin 68, and the pivot pin 68 is pulled out of the aperture 40 in the bracket portion 36 of the bracket 34 by means of pull on the eye 72 at the other end of the pin. Thereafter, the rigid strut member 28 can be manually moved to the angular position shown by the solid lines by means of the spherical bearing assembly 54 to bring about an alignment of the aperture 42 in the bracket portion 38 of the bracket 34 with the aperture 60 in the spherical bearing assembly so that the pivot pin 68 can be reinserted in the new aperture 42 to lock the rigid strut member 28 in the newly adjusted position. A bar 101 positioned below a boss 100 prevents misalignment of the rigid strut member 28 with the apertures 40 and 42 when changing the angular position of the strut.

It will be seen from the foregoing, in connection with the figures in the drawings and particularly FIG. 4, that by this arrangement a universal pivot-bearing support for the lower rigid strut member 28 on the frame 12 has been provided which requires no additional bracket or pivoting means to enable the strut member 28 to be adjusted in an angular horizontal position as well as to be pivoted vertically, which is made possible by the provision of the spherical bearing assembly in one support bracket and selectively spaced apertures in an opposite support bracket. The pivot pin 68, upon relocation of the strut member 28, does not have to be completely removed but needs only to be pulled out of the respective aperture in the one bracket 34 to enable the strut member 28 to be swung around to the selected angular position, made possible by means of the spherical bearing assembly 54 in the opposite bracket member 32.

It will be obvious that the reposition bracket 34 may be constructed such as to provide an angular portion, opposite from the angular portion 38 to enable repositioning of the rigid strut member 28 in the opposite direction, as that indicated in FIG. 4, and this movement could likewise be accommodated by the cooperating arrangement between the pivot pin 68 and the spherical bearing assembly 54.

Figure 3:
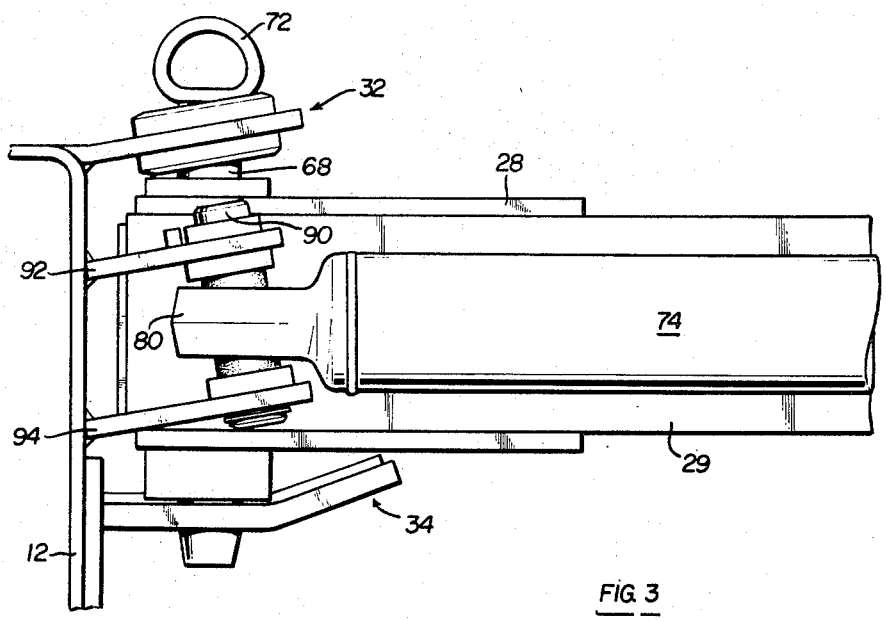
FIG. 3 is a detailed plan view of the pivoting arrangement for the stabilizer assembly shown in FIG. 2.
Figure 2:
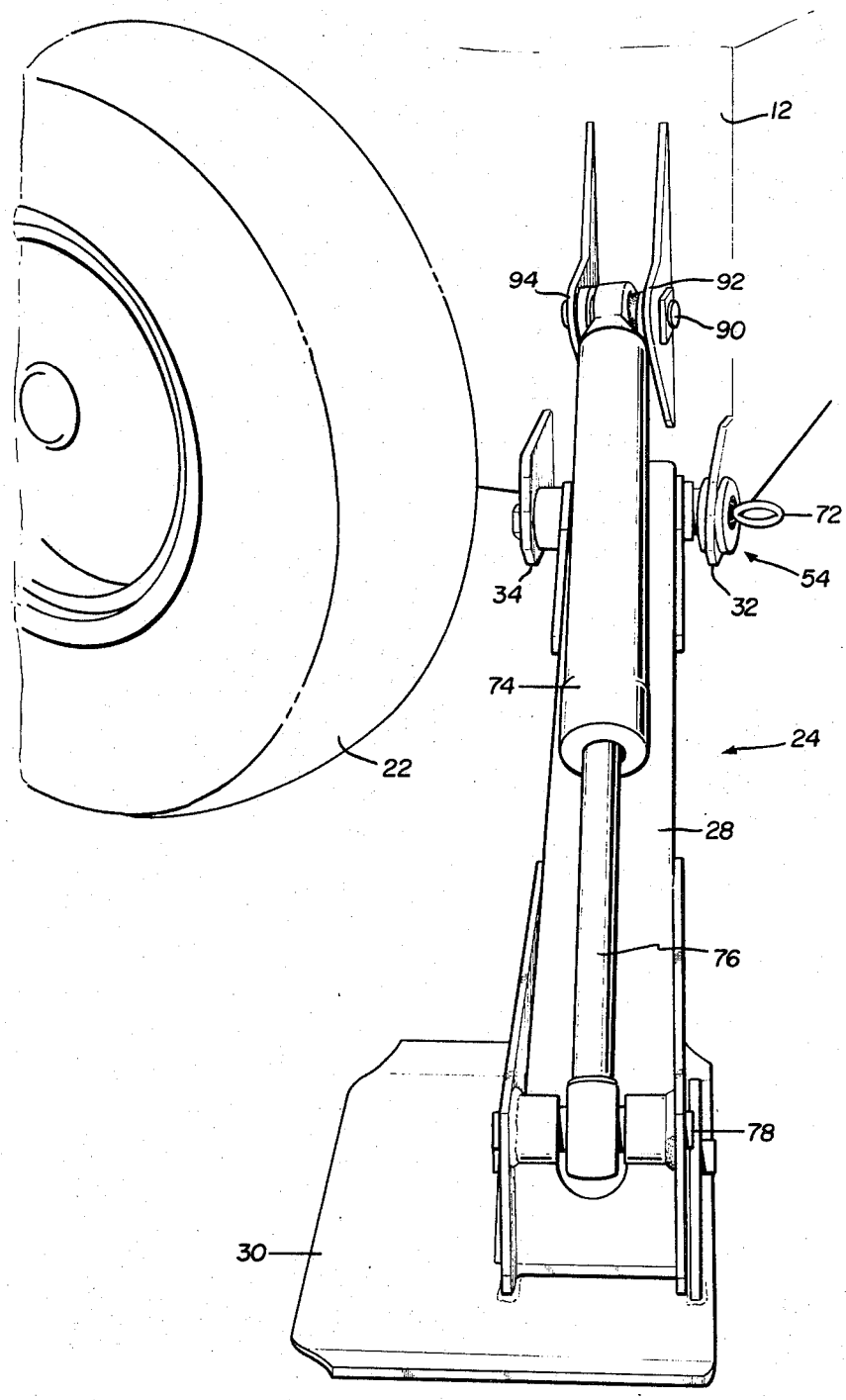
FIG. 2 is an enlarged top view of one of the stabilizer means illustrated in the machinery in FIG. 1.
Figure 5:
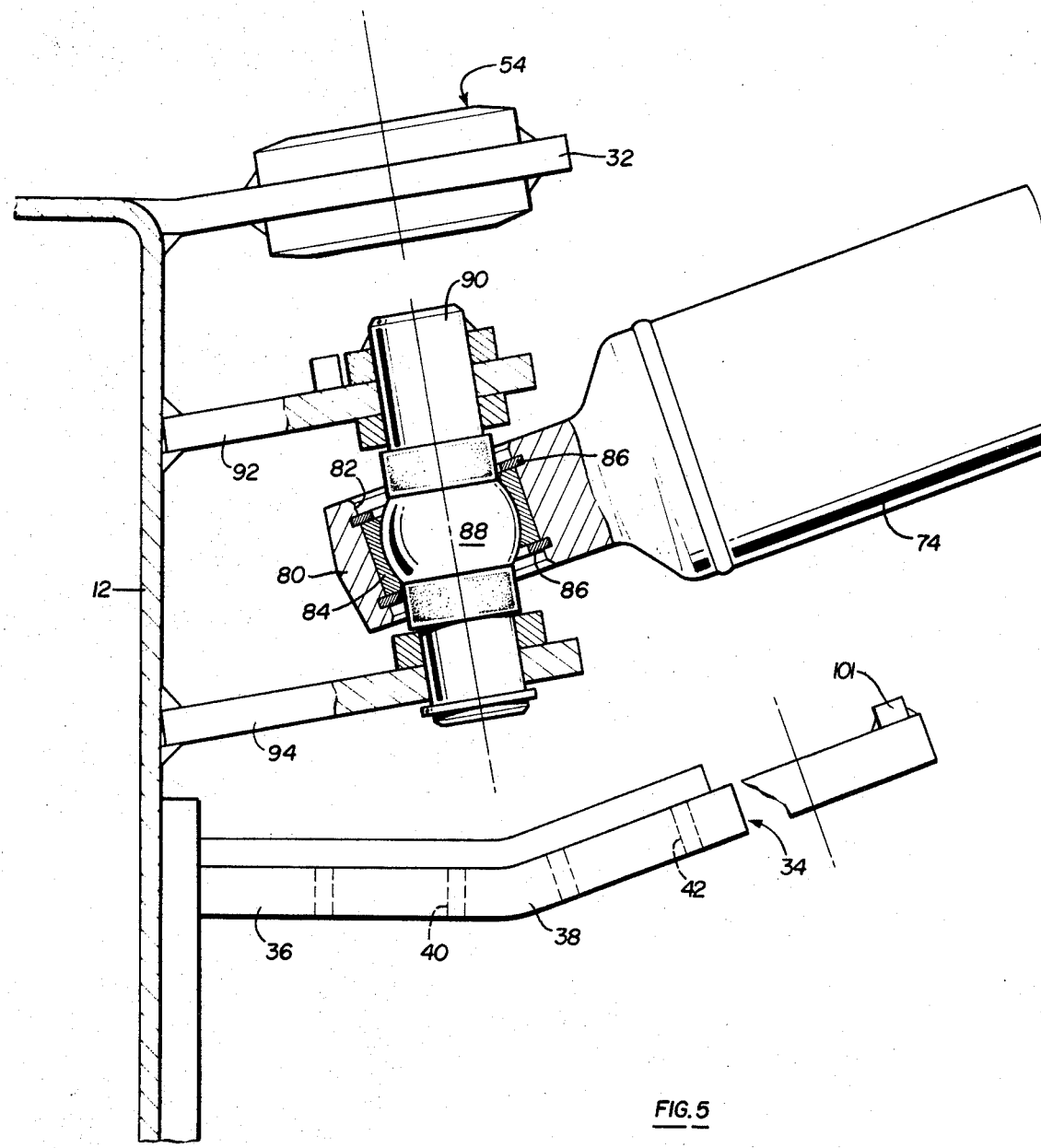
FIG. 5 is a cross-sectional view through the machinery similar to FIG. 4 showing the pivot end of the extendable link for the stabilizer arm in more detail.

With particular reference now to FIGS. 3 and 5, the stabilizer arm assembly 24 also includes, in addition to the lower rigid strut member 28, an upper extendable link or linear actuator in the form of a hydraulic cylinder 74 and piston rod 76 longitudinally adjustably extending therefrom for pivotal connection at 78 to the outer end of the rigid strut member 28. The other end of cylinder or linear actuator 74 is provided with a connecting member in the form of an eye 80 having an aperture 82 which receives an outer spherical bearing member 84. The outer spherical bearing member 84 is secured against axial movement within the aperture 82 by means of oppositely disposed retaining rings 86 and is adapted to be pivotally, universally supported on an inner spherical bearing member 88 which is secured against rotation on a shaft or pin 90 whose outer ends are supported in oppositely disposed parallel brackets 92 and 94 respectively.

The brackets 92 and 94 are welded to the lateral side of the frame 12 for extension therefrom outwardly at a position above brackets 32 and 34 and are located substantially in the center between the lower brackets 32 and 34. It will be seen that the upper brackets 92 and 94, which support the linear actuator 74 are angularly disposed with respect to the side of the frame 12 and extend in a direction substantially parallel to the disposition of the lower bracket 32.

It will be evident from the foregoing description and the appended drawings that the present invention provides an improved stabilizer arm assembly for an earthmoving machine to obtain digging stability when utilized in conjunction with a tractor backhoe operation.

The vertically and horizontally swingable stabilizer arm assembly enables the operator of the machine to position the stabilizer arm assembly such that the stability of the machinery unit is increased under particular operating conditions, as distinguished from a stationary stabilizer assembly. This is accomplished by the herein described stabilizer arm assembly of the present invention, by swinging the stabilizer arm assembly fore or aft in regard to a tractor-backhoe unit during straight digging to the rear, to provide improved stability not being available in a fixed stabilizer unit assembly which conventionally extends essentially at a 90° angle in relation to the machine centerline.

The present improved stabilizer assembly can be utilized in a variety of construction machinery installations, but is of particular utility in a tractor-backhoe operation.

The mounting arrangement for the stabilizer assembly comprises a spherical bearing in a stationary mounting bracket for each stabilizer arm, and a spherical bearing for the stabilizer-actuating cylinder for attachment to a backhoe main frame, and a removable pin at the stabilizer arm mounting point for positioning of the stabilizer arm. The stationary mounting brackets at the stabilizer arm mounting point have a plurality of holes or apertures for positioning of the stabilizer arm in conjunction with a spherical bearing in the opposite bracket. Thus, the operator of the machinery has only to disengage the pin from the stationary bracket, rotate the stabilizer arm to its adjusted position, and reengage the pin in another aperture.

Furthermore, the present invention provides that, by correctly choosing the backhoe frame attaching points, the vertical lift of one stabilizer arm assembly on one side of the machinery unit can be considerably increased over the vertical lift capability of the stabilizer arm assembly at the other side of the unit, which is particularly useful in increasing the hillside balance.

Although the present invention has been described in connection with only one preferred embodiment thereof, it will be understood that various modifications in structure and arrangement may be asserted to without departing from the spirit and essential characteristic thereof, and such modifications are intended to be included within the scope of the appended claims.

What is claimed is:

1. In an earthmoving machine supported on a land vehicle comprising an implement mounted on an adjustable boom for selective extension and contraction under load relative to said vehicle, said vehicle having rotatable ground support means, a load absorbing and stabilizing mechanism pivotally attached to said earthmoving machine to support the earthmoving machine when said earthmoving machine is in working position comprising a pair of stabilizer arms, each such arm having its inner end pivotally attached to the frame of said earthmoving machine to extend from either side of said frame, each such arm having a ground-engaging pad at its outer end, and each of said stabilizer arms being pivotally secured to a linear actuator pivotally connected between said frame and a medial portion of said stabilizer arm, actuation of said actuator swinging said stabilizer arm in a vertical plane relative to said ground; the improvement comprising: a first pair of spaced apertured bracket means interposed between the inner end of each stabilizer arm and said frame, one of said bracket means being provided with at least two apertures disposed in an angular position relative to each other, the other of said bracket means supporting a spherical bearing, the inner end of each of said stabilizer arms extending between one of said pair of bracket means and being provided with an aperture adapted to be aligned with said spherical bearing on said other bracket means and with a selected one of said apertures in said one bracket means, a pivot pin removably extending through said spherical bearing, through said aperture in said stabilizer arm and through the selected aperture in said one bracket means to pivotally connect said stabilizer arm to said frame, said spherical bearing and said other bracket permitting relocation of said stabilizer arm in a horizontal plane by repositioning said pin in another selected aperture of said one bracket means; and universal bearing means interposed between said linear actuator and said frame to permit pivotal movement of said linear actuator as said stabilizer arm is relocated.

2. In a stabilizing arrangement for a backhoe or the like having a frame supporting a load-handling implement for intermittent extension and contraction relative to said frame, and swinging movement about a vertical axis, ground support means for said frame comprising at least one stabilizer arm pivoted to one side of said frame for (1) swinging movement in a vertical plane between an inactive position and a ground-engaging position and (2) adjustable swinging movement in a horizontal plane to vary the angular position of said stabilizer arm relative to the longitudinal centerline of said frame; the improvement comprising: opposed bracket means extending from said frame adapted to receive one end of said stabilizer arm having an aperture therein; one of said bracket means being provided with a universal bearing and the other of being bracket means being provided with a plurality of apertures, a removable pivot pin adapted for extension through said universal bearing, through said aperture in said stabilizer arm and through a selected aperture of said plurality of apertures in said other bracket means to pivotally connect said stabilizer arm to said frame for swinging movement in said vertical plane about said pivot pin and adjustable swinging movement in said horizontal plane about said universal bearing; an extendable link pivotally connected to the other end of said stabilizer arm; means to universally pivotally connect said extendable link to said frame above the pivot connection of said stabilizer arm to thereby permit unitary swinging movement of said stabilizer arm and said extendable link in a vertical plane and adjustable swinging movement in a horizontal plane wherein said stabilizer arm is being angularly positioned by the removal of said pivot pin from the selected aperture in said other bracket and red is position of said pivot pin in another selected aperture in said other bracket to thereby vary the angular horizontal position of said stabilizer arm in the fore or aft direction relative to said frame.

* * * * *